Feb. 9, 1926.
R. A. MAGOR ET AL
FISHING TOOL
Filed Nov. 20, 1924
1,572,615
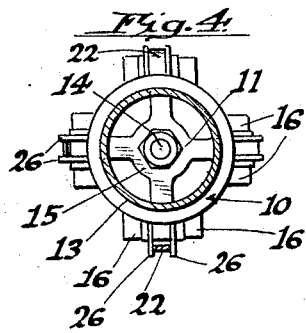
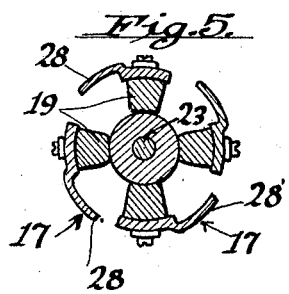
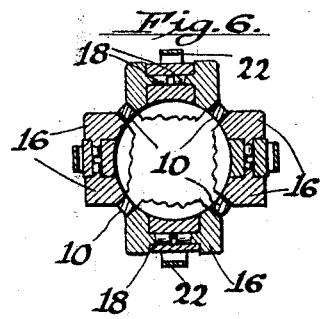
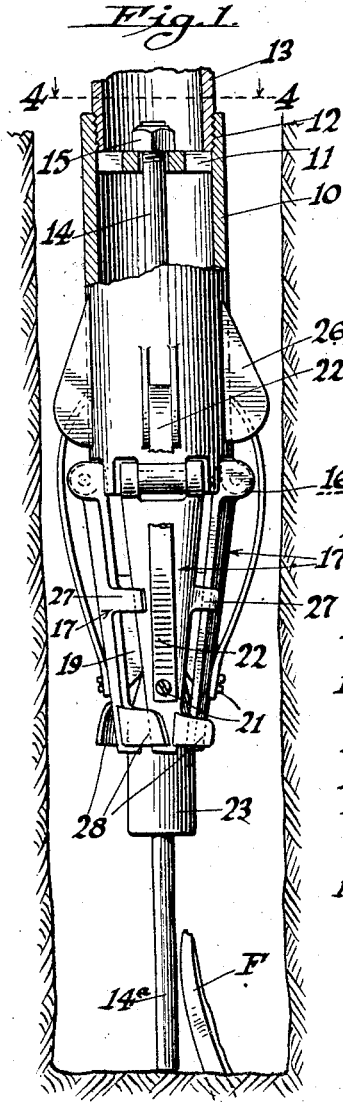
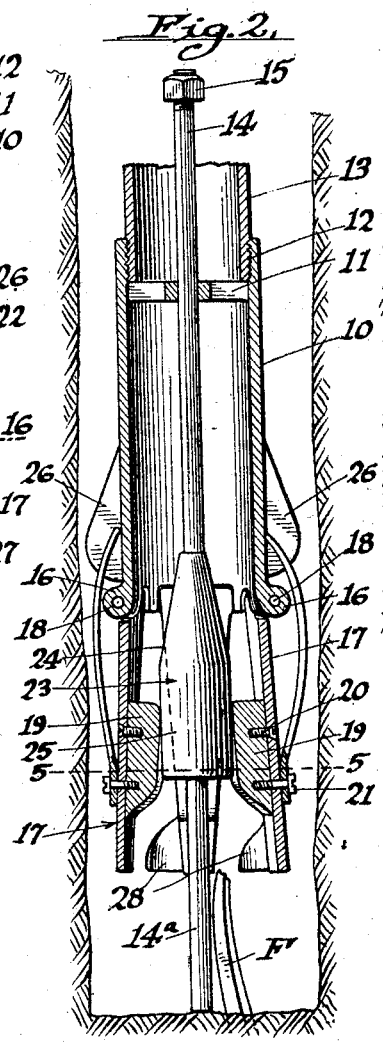
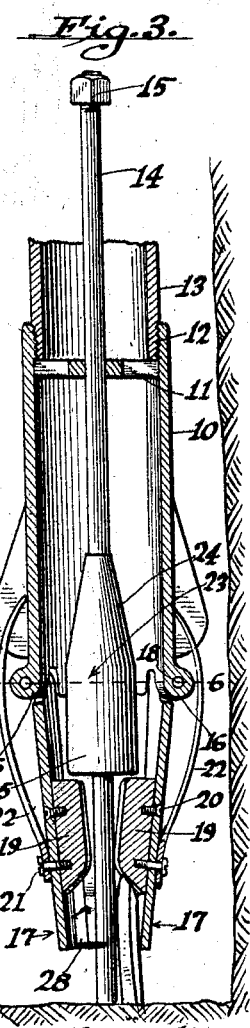

Patented Feb. 9, 1926.

1,572,615

UNITED STATES PATENT OFFICE.

RICHARD A. MAGOR AND WALTER STONE, OF LONG BEACH, CALIFORNIA.

FISHING TOOL.

Application filed November 20, 1924. Serial No. 751,080.

*To all whom it may concern:*

Be it known that we, RICHARD A. MAGOR and WALTER STONE, citizens of the United States, residing at Long Beach, in the county of Los Angeles and State of California, have invented new and useful Improvements in Fishing Tools, of which the following is a specification.

This invention relates to improvements in fishing tools.

It is an object of this invention to provide a fishing tool adapted to engage upon and remove small articles, such as cones, discs and the like, from the bottom of deep wells.

It is a further object of this invention to provide a fishing tool consisting of a body carrying a plurality of fish engaging members, which fishing tool may be lowered into the well with the fish engaging members in contracted position; and to provide means whereby when the bottom of the well is engaged by the fishing tool, the fish engaging members will be forced into expanded position and then allowed to contract upon any fish which they may encounter.

With the foregoing and other objects in view which will be made manifest in the following detailed description and pointed out in the appended claims, reference is had to the accompanying drawings for an illustrative embodiment of the invention, wherein:

Figure 1 is a vertical section through a well showing the fishing tool in position after having encountered the bottom of the well;

Fig. 2 is a view similar to Fig. 1 showing the fish engaging members forced into expanded position;

Fig. 3 is a similar view to Figs. 1 and 2 showing the fish engaging members after having been allowed to contract upon a fish;

Fig. 4 is a view taken substantially on the line 4—4 of Fig. 1;

Fig. 5 is a view taken substantially on the line 5—5 of Fig. 2; and

Fig. 6 is a section taken substantially on the line 6—6 of Fig. 3.

Referring to the accompanying drawings wherein similar reference characters designate similar parts throughout, the improved fishing tool consists of a cylindrical body 10, in which is formed a suitable spider 11. The interior of the body 10 is preferably threaded, as at 12, to permit the body to be secured to the lower end of a string of drill tube 13. A suitable stem 14 extends through the meeting legs of the spider 11 and is slidable within the body 10. The upper end of the stem 14 is provided with a suitable enlargement which in the present form of invention consists of a nut 15 adapted to engage the spider 11 and limit the downward movement of the stem 14 with respect to the body. Adjacent the lower edge of the cylindrical body 10 there are formed a plurality of lugs 16 and the upper ends of the fish engaging members 17 are bent about pins 18 extending toward each other from the lugs 16. The pins 18 serve to pivotally connect the fish engaging members to the cylindrical body 10. Upon the inner surfaces of the fish engaging members 17 there are provided shoes 19 which may be secured in position by means of screws 20 and cap screws 21. The cap screws 21 serve to additionally secure leaf springs 22 to the fish engaging members 17. The leaf springs 22 have their upper ends in engagement upon the exterior surface of the body 10 and serve to urge the fish engaging members 17 into contracted position, as shown in Figs. 1 and 3.

The stem 14 carries a head 23, the upper end of which is conical in form, as indicated at 24, and the lower end of which is cylindrical in form, as indicated at 25. This head 23 engages the shoes 19 carried upon the inner sides of the fish engaging members 17 and upon upward movement of the stem 14 relatively to the body 10 causes the fish engaging members 17 to be expanded against the action of the leaf springs 22. Ribs 26 are formed upon the cylindrical body 10 upon each side of each of the leaf springs 22 and serve as guides for the ends of these springs as they slide upwardly upon the body 10 because of the expansion of the fish engaging members 17. Each of the fish engaging members 17 is provided with a finger 27 which extends over the adjacent fish engaging member, as clearly shown in Fig. 1. Suitable arms 28 are carried by the lower ends of each of the fish engaging members 17 and extend over the adjacent fish engaging member. The fingers 27 serve to cause all of the fish engaging members 17 to expand and contract simultaneously, and the arms 28 extend across the opening between the lower ends of the fish engaging members 17 when these fish engaging members are in expanded position, so as to prevent the fish F from slipping between the lower ends of the fish engaging members 17 as they contract. The lower end of the stem 14 extends below the head 23, as indicated at 14ª.

The operation of the fishing tool is as follows: The body 10 is secured upon the lower end of the drill tube 13 and the whole is lowered into a well in the position shown in Fig. 1. In this position the head 23 is disposed below the shoes 19 carried by the fish engaging members 17, and the nut 15 rests upon the spider 11. The leaf springs 22 urge the fish engaging members 17 into contracted position about the stem 14 above the head 23. When the portion 14ª of the stem 14 engages the bottom of the well, downward movement of the body 10 causes the head 23 to engage the shoes 19. The conical portion 24 of the head 23 produces the expansion of the fish engaging members 17. As the shoes 19 engage the cylindrical portion 25, the body 10 may be lowered without causing further expansion or contraction of the fish engaging members 17. Upon still further lowering the body 10, the shoes 19 will slip over the bottom edge of the cylindrical portion 25 of the head 23 and the springs 22 will cause the fish engaging members 17 to contract so as to engage or clamp upon a fish F, which fish may be clamped between the separate fish engaging members or between one or more fish engaging members 17 and the portion 14ª of the stem 14.

It will be readily appreciated that the improved fishing tool cannot be readily employed in removing broken sections of drill tube and such articles from the bottom of a well, but is highly advantageous for picking up and removing small articles as above stated.

When it is desired to reset the fishing tool, the fish engaging members 17 may be pulled apart against the action of the springs 22 to permit the head 23 and the stem 14 to slide downwardly within the body 10, the head 23 passing between the shoes 19. If desired, the cap screws 21 may be loosened so as to reduce the action of the leaf springs 22 and this will permit the fish engaging members 17 to swing outwardly very easily, thereby permitting the head 23 to slip downwardly between the shoes 19.

It will be understood that various changes in the detail of construction may be made without departing from the spirit or scope of the invention as defined by the appended claims.

We claim:

1. A finishing tool comprising a body, a plurality of fish engaging elements pivoted to said body, spring means for urging said fish engaging elements into contracted position, a stem carried by said body and slidable thereon, and a head formed upon said stem adapted to engage the interior surfaces of said fish engaging elements to cause their expansion before contraction.

2. A fishing tool comprising a body, a plurality of fish engaging elements pivoted to said body, spring means for urging said fish engaging elements into contracted position, a stem carried by said body and slidable thereon, and a head formed upon said stem adapted to engage the interior surfaces of said fish engaging elements to cause their expansion before contraction, said stem being adapted to be forced upwardly within said body upon engagement with the bottom of a well.

3. A fishing tool comprising a body, a plurality of fish engaging element pivoted to said body, leaf spring carried by said fish engaging elements and engaging said body so as to urge said fish engaging elements into contracted position, a stem slidable within said body, and a head carried by said stem adapted to engage said fish engaging elements to produce expansion thereof before contraction.

4. A fishing tool comprising a body, a plurality of fish engaging elements pivoted to said body, leaf springs carried by said fish engaging elements and engaging said body so as to urge said fish engaging elements into contracted position, a stem slidable within said body, and a head carried by said stem adapted to engage said fish engaging elements to produce expansion thereof before contraction, said head having its upper end conical in form and its lower end cylindrical in form, whereby upon downward movement of said body relatively to said stem, said fish engaging elements will first be expanded, then moved downwardly without being further expanded or contracted, and then allowed to contract.

5. A fishing tool comprising a body, a plurality of fish engaging elements pivoted to said body, leaf springs carried by said fish engaging elements and engaging said body so as to urge said fish engaging elements into contracted position, a stem slidable within said body, a head carried by said stem adapted to engage said fish engaging elements to produce expansion thereof before contraction, and fingers carried by each of said fish engaging elements adapted to extend over an adjacent fish engaging element.

6. A fishing tool comprising a body, a plurality of fish engaging elements pivoted to said body, leaf springs carried by said fish engaging elements and engaging said body so as to urge said fish engaging elements into contracted position, a stem slidable within said body, a head carried by said stem adapted to engage said fish engaging elements to produce expansion thereof before contraction, and arms carried by the lower ends of each of said fish engaging elements adapted to extend over an adjacent fish engaging element when said fish engaging elements are in contracted position.

7. A fishing tool comprising a cylindrical body, a spider formed in said body, a stem slidably mounted upon said spider and disposed within said body adapted to be forced upwardly therein upon engagement with the bottom of a well, a plurality of fish engaging members pivoted to said body, spring means for urging said fish engaging members into contracted position, and a head carried by said stem for forcing said fish engaging members into expanded position before allowing them to contract.

8. In a fishing tool, a plurality of swinging fish engaging elements, and means for contracting said fish engaging elements, each fish engaging element being provided with a lateral finger adapted to extend over an adjacent fish engaging element when the fish engaging elements are in contracted position.

9. A fishing tool comprising a body, a plurality of fish engaging elements pivoted upon said body, means providing projections upon the inside surfaces of said fish engaging elements, a stem carrying a head slidable within said fish engaging elements, the head being adapted to ride over said projections upon engagement between the stem and an obstruction to expand the fish engaging elements, and spring means engageable upon said fish engaging elements and upon said body, urging said fish engaging elements into contracted position.

In testimony whereof we have signed our names to this specification.

RICHARD A. MAGOR.
WALTER STONE.